(12) United States Patent  
Ishigaki (10) Patent No.: US 11,135,991 B2  
(45) Date of Patent: Oct. 5, 2021

(54) AIRBAG DEVICE

(71) Applicant: Autoliv Development AB, Vargarda (SE)

(72) Inventor: Ryota Ishigaki, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 150 days.

(21) Appl. No.: 16/551,862

(22) Filed: Aug. 27, 2019

(65) Prior Publication Data

US 2020/0070762 A1    Mar. 5, 2020

(30) Foreign Application Priority Data

Aug. 31, 2018 (JP) ............................. JP2018-163662  
Jun. 11, 2019 (JP) ............................. JP2019-108796

(51) Int. Cl.
  *B60R 21/203* (2006.01)
  *B60R 21/2338* (2011.01)
  *B60R 21/235* (2006.01)

(52) U.S. Cl.
  CPC .......... *B60R 21/203* (2013.01); *B60R 21/235* (2013.01); *B60R 21/2338* (2013.01); *B60R 2021/23382* (2013.01); *B60R 2021/23509* (2013.01)

(58) Field of Classification Search
  CPC . B60R 21/203; B60R 21/2338; B60R 21/235; B60R 2021/23509; B60R 2021/23382; B60R 21/2035; B60R 21/231
  See application file for complete search history.

(56) References Cited

U.S. PATENT DOCUMENTS

| | | | | |
|---|---|---|---|---|
| 5,478,114 | A | * 12/1995 | Maurer | ................. B60R 21/233 280/743.2 |
| 2001/0028162 | A1 | * 10/2001 | Takimoto | ............... B60R 21/237 280/731 |
| 2011/0062693 | A1 | * 3/2011 | Williams | ............. B60R 21/2338 280/743.2 |
| 2016/0250993 | A1 | * 9/2016 | Nagatani | ............... B60R 21/203 280/730.1 |
| 2017/0057453 | A1 | * 3/2017 | Morris | .................. B60R 21/203 |
| 2018/0297550 | A1 | * 10/2018 | Kitagawa | ............ B60R 21/2334 |
| 2019/0193671 | A1 | * 6/2019 | Hotta | .................. B60R 21/2338 |
| 2019/0217806 | A1 | * 7/2019 | Hotta | .................. B60R 21/2338 |

* cited by examiner

Primary Examiner — Darlene P Condra  
(74) Attorney, Agent, or Firm — Stoel Rives LLP (57) ABSTRACT

[Issue] An objective of providing an airbag device enabling efficiently suppressing injury of the occupant during an emergency.

[Resolution Means] A representative structure of the airbag device 100 according to the present invention includes an inflator 112 that is installed on a vehicle and is able to supply gas, an airbag cushion 104 that expands and deploys in front of the seating position of the vehicle occupant based on the gas, and at least one internal tether 116 with a first end 122 connected to the seating position side inside the airbag cushion 104 and a second end 124 connected to the vehicle front side inside the airbag cushion 104. The airbag cushion 104 is characterized by a recessed concave part 114 formed through pulling of the internal tether 116 on the center of the seating position side.

20 Claims, 5 Drawing Sheets

AIRBAG DEVICE

CROSS-REFERENCE TO RELATED APPLICATIONS

This application claims the benefit of Japanese Patent Application No. 2018-163662 filed Aug. 31, 2018 and Japanese Patent Application No. 2019-108796 filed Jun. 11, 2019, the disclosure of which are herein incorporated by reference in their entirety.

TECHNICAL FIELD

The present invention is related to an airbag device for restraining passengers during an emergency.

BACKGROUND TECHNOLOGY

In recent years airbag devices have become standard equipment for the most part. An airbag device is safety equipment that operates in an emergency such as a vehicle collision where an airbag cushion that expands and deploys based on gas pressure is used to restrain and protect the passenger. There are several types of airbag devices depending on installation location and application. For example, for protecting passengers in the front from a collision primarily in the longitudinal direction, a driver airbag is provided in the center of the steering wheel for the driver's seat and a passenger airbag is provided near the passenger seat in the instrument panel or close by. Others include curtain airbags that expand and deploy along the side window provided near the ceiling in the wall to protect passengers in front and back rows from a side collision or subsequent rollover and side airbags provided to the side of the seat that expand and deploy into the armpit area of the passenger.

The airbag cushion of each type of airbag device may be divided up into a plurality of compartments internally based on the purpose and the environment of the device. For example, with the passenger protection device (driver airbag) according to patent claim 1, the airbag cushion is made up of a central airbag 1 in the center and an outer circumference airbag 3 at a periphery thereof. With the construction of patent document 1, the restraining surface that restrains the passenger expands flat becoming a broad surface enabling reliable stopping of the passenger.

PRIOR ART DOCUMENTS

Patent Document
Patent document 1: Japanese Unexamined Patent Application H01-132444

SUMMARY OF THE INVENTION

Currently, airbag devices are also demanded to support irregular collisions such as collisions from a diagonal longitudinal direction relative to the vehicle, or so-called oblique collision. In an oblique collision, passengers approach the airbag cushion that is in front of the seat at an irregular angle such as a diagonal direction. Here, if the head of a passenger comes into contact with the airbag cushion that is in front of the seat, there are cases where the head rotates with the neck as an axis, as viewed from above. From the perspective of a human body structure, this type of rotation of the head can easily become a cause of an increased injury level of the passenger, and there is therefore desire to prevent this in an effective manner.

Problem to be Resolved by the Invention

In light of this type of issue, an object of the present invention is to provide an airbag device that effectively suppresses an injury level of the passenger in an emergency.

Means for Solving the Problem

In order to resolve the issue described above, a representative structure of an airbag device according to the present invention includes an inflator that is installed on a vehicle and is able to supply gas, an airbag cushion that expands and deploys in front of the seating position of the vehicle occupant based on the gas, and at least one internal tether with a first end connected to the seating position side inside the airbag cushion and a second end connected to the vehicle front side inside the airbag cushion, wherein the airbag cushion forms a concave part at the center of the seating position side recessed due to pulling by the internal tether.

With the structure described above, the concave part enables avoiding or delaying contact of the airbag cushion with the center of the upper part of the body of the passenger, in other words the area near the chin. Generally, the head of a person can be rotated easily when force is exerted on the chin. The structure described above suppresses impact on the chin of the passenger and reduces rotation of the head and thus mitigates the level of injury.

The inflator and airbag cushion described above are installed in a location in front of the seating position in the passenger cabin. Part of the inflator is inserted inside the airbag cushion. The second end of the internal tether is connected among the inflator or the airbag cushion, near the inflator.

With the structure described above, the second end of the internal tether is fixed, and therefore, the first end more readily pulls on the airbag cushion enabling favorable forming of the concave part.

The internal tether is formed with dimensions enabling tensioning during expansion and deployment of the cushion. This structure enables favorable forming of the concave part.

The airbag cushion described above includes a center base fabric formed at the bottom of the concave part where the internal tether is connected and an external base fabric that forms the outer surface other than the center base fabric. The center base fabric is circular and the external base fabric is formed surrounding the circular center base fabric.

With the structure described above, the function of the internal tether favorably forms the concave part.

The external base fabric described above can include a plurality of ring shaped or tube shaped base cloths arranged concentric with the center base fabric. This structure also enables favorable forming of the concave part.

The internal tether described above can include, as viewed from the seating position, a first tether and second tether arranged to the upper left and right and a third tether provided between the first tether and the second tether above or below as viewed from the first tether and second tether. The plurality of internal tethers enable favorable forming of the concave part.

The first tether and second tether described above can be arranged on the upper side as viewed from the seating position and the third tether can be provided on the lower side as viewed from the first tether and second tether. The plurality of internal tethers enable favorable forming of the concave part.

The third tether described above can be arranged at a position farther away from the first tether and second tether than the distance between the first tether and second tether. This structure enables favorable forming of a broad concave part.

The inflator and airbag cushion described above can be stowed in the steering wheel of the vehicle. This structure enables favorable use of this airbag device as a driver airbag.

Effect of the Invention

With the present invention, an airbag device that can efficiently suppress the injury level of occupants during an emergency can be provided.

DESCRIPTION OF THE PREFERRED EMBODIMENTS

A favorable embodiment of the present invention is described with reference to the attached drawings below. The dimensions, materials, and other specific values described in the embodiments are only an illustration to provide simple understanding of the invention, and unless otherwise stated, do not restrict the present invention. Furthermore, for components that have substantially similar functions and configurations in the specifications and drawings, duplicate explanations will be omitted with the assignment of an identical symbol. In addition, components that are not directly related to the present invention are omitted from the drawings.

Figure 1:
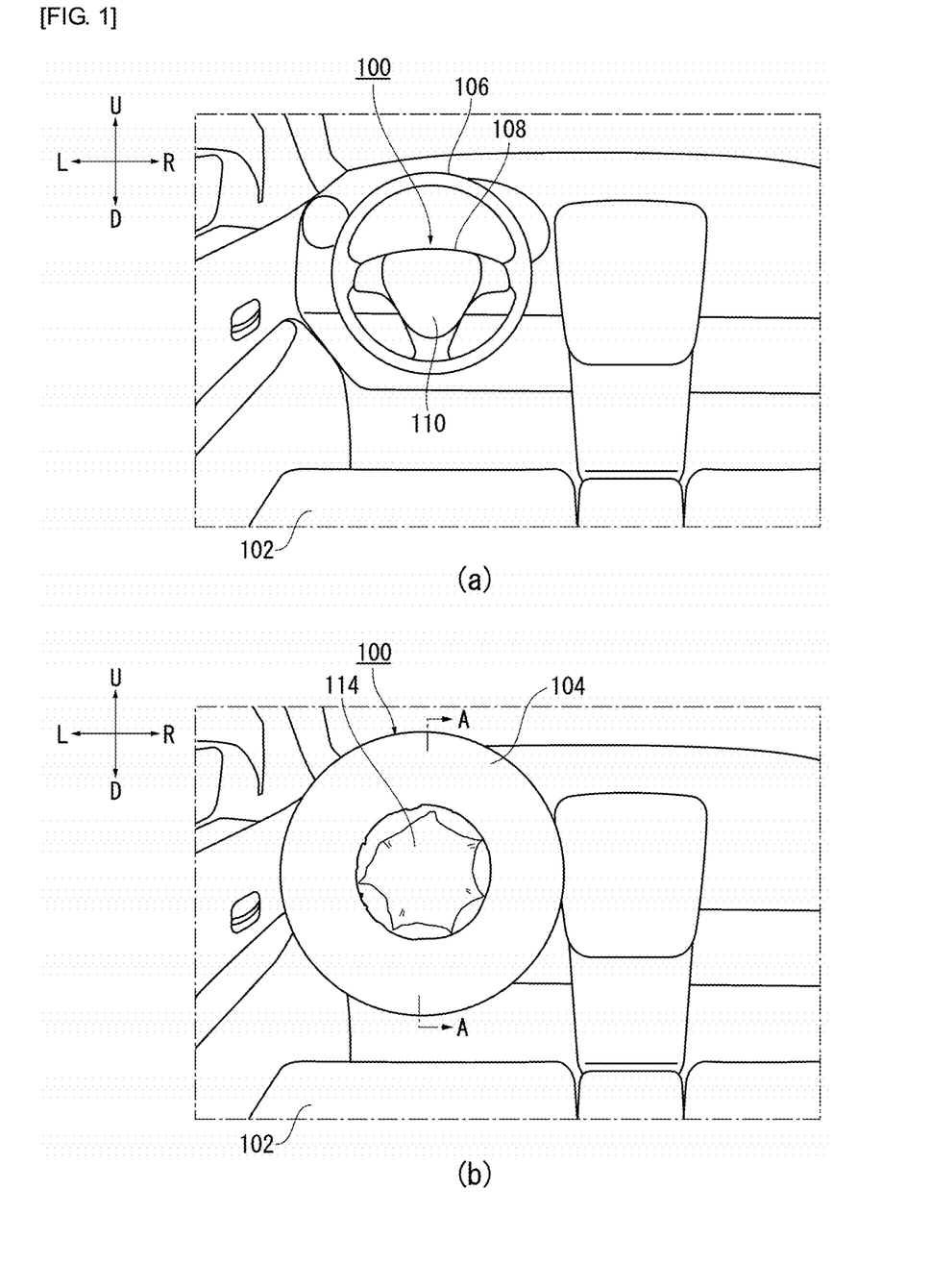
FIG. 1 is a drawing that illustrates an overview of the airbag device according to the embodiment of the present invention.

FIG. 1 is a figure that illustrates an overview of the airbag device 100 according to the embodiments of the present invention. FIG. 1(a) is a figure that illustrates a vehicle before operation of the airbag device 100. Hereafter, regarding FIG. 1 and other diagrams, the front and back of a vehicle are illustrated by the symbols F (Forward) and B (Back), the left and right sides of the vehicle by the symbols L (Left) and R (Right), and the top and bottom of the vehicles by the symbols U (Up) and D (Down).

The airbag device 100 is applied in the present embodiment as the driver airbag for the driver's seat for left-hand cars (front row left side seat 102). Hereafter, explanations are made assuming the front row right side seat 102, for example, the outer side of the vehicle (hereafter, outer vehicle side) means the left side of the vehicle, and the inner side of the vehicle (hereafter, inner vehicle side) means the right side of the vehicle.

The airbag cushion of the airbag device 100 (hereafter, cushion 104 (see FIG. 1(b)) is stored in a folded or wound up state placed in front of the seated position of the interior seat 102 in a storage compartment 108 in the center of the steering wheel 106. The storage compartment 108 9 includes a cover 110, a housing therebelow (omitted in diagram), and the like.

In addition to the cushion 104, an inflator 112 (see FIG. 3(a)), which is a gas generation device, is also stored in the storage compartment 108. Operation of the inflator 112 is caused by a shock detection signal sent by a sensor, not shown, and supplies gas to the cushion 104 (see FIG. 1(b)). The cushion 104 begins to expand based on the gas from the inflator 112, rips opens the cover 110 from the expansion pressure or the like, and is expanded and deployed towards the seat 102.

Furthermore in the present embodiment, the inflator 112 uses a disk type. The inflator 112 is fixed on the bottom surface of the housing compartment (see FIG. 1(a)), and a part that includes a gas injector is inserted inside the cushion 104 (see FIG. 3(a)). Currently inflators in widespread use include a type filled with a gas generation agent that generates gas using combustion, a type filled with compressed gas which provides gas without generating heat, and a hybrid type that uses both combustible gas and compressed gas. The inflator 112 can use any of these types.

FIG. 1(b) is a drawing that illustrates a vehicle after the expansion and deployment of the cushion 104 of the airbag device 100. The cushion 104 expands and deploys as a bag forward toward the seated position of seat 102 based on gas from the inflator 112, restraining the upper body and head of an occupant traveling forward. The cushion 104 has a disk shape as seen from the seating position side, and is formed with a plurality of base fabrics that make up the surface and are layered through sewing or adhesion.

Figure 2:
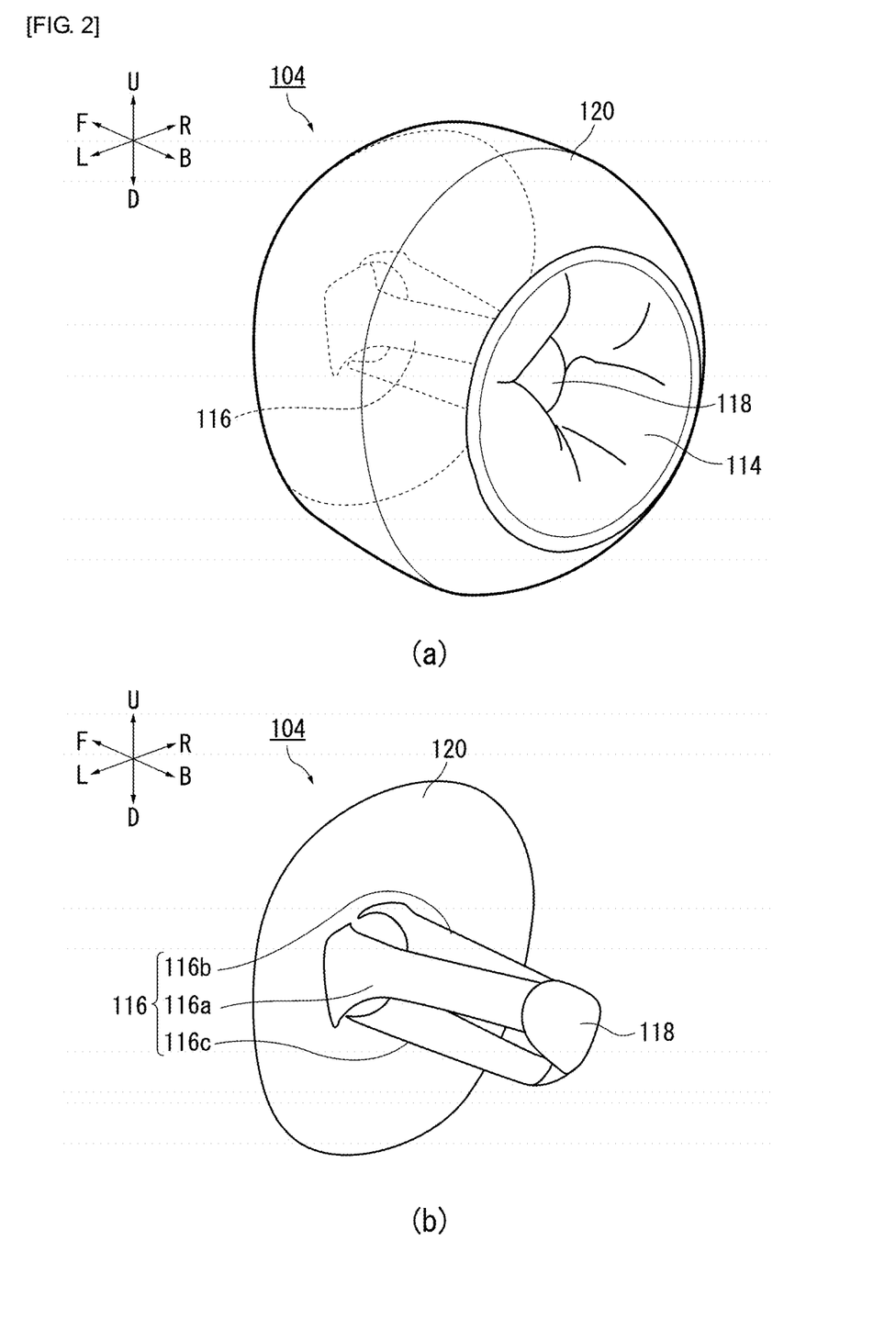
FIG. 2 is a drawing that illustrates the cushion in FIG. 1(b) from all directions while expanding and deploying.

FIG. 2 is a drawing that illustrates the cushion 104 in FIG. 1(b) from all directions while expanding and deploying. FIG. 2(a) illustrates the cushion 104 in FIG. 1(b) seen from somewhat above the outer vehicle side. The cushion 104 of the present embodiment is a distinct part with a recessed center on the side of the occupant seat, forming the concave part 114. The concave part 114 is formed using internal tethers 116 provided in the cushion 104 pulling on the base fabric of the cushion 104.

FIG. 2(b) is a figure illustrating the exposed internal tethers 116 from FIG. 2(a). The internal tethers 116 are belt-shaped components, and there are three provided in total (the first tether 116a, the second tether 116b, and the third tether 116c). One end of the internal tethers 116 are attached to the center base fabric 118 in the cushion 104 from the inside seating position, and the other end is connected inside the cushion 104 that is the opposite side, located to the front of the vehicle.

Figure 3:
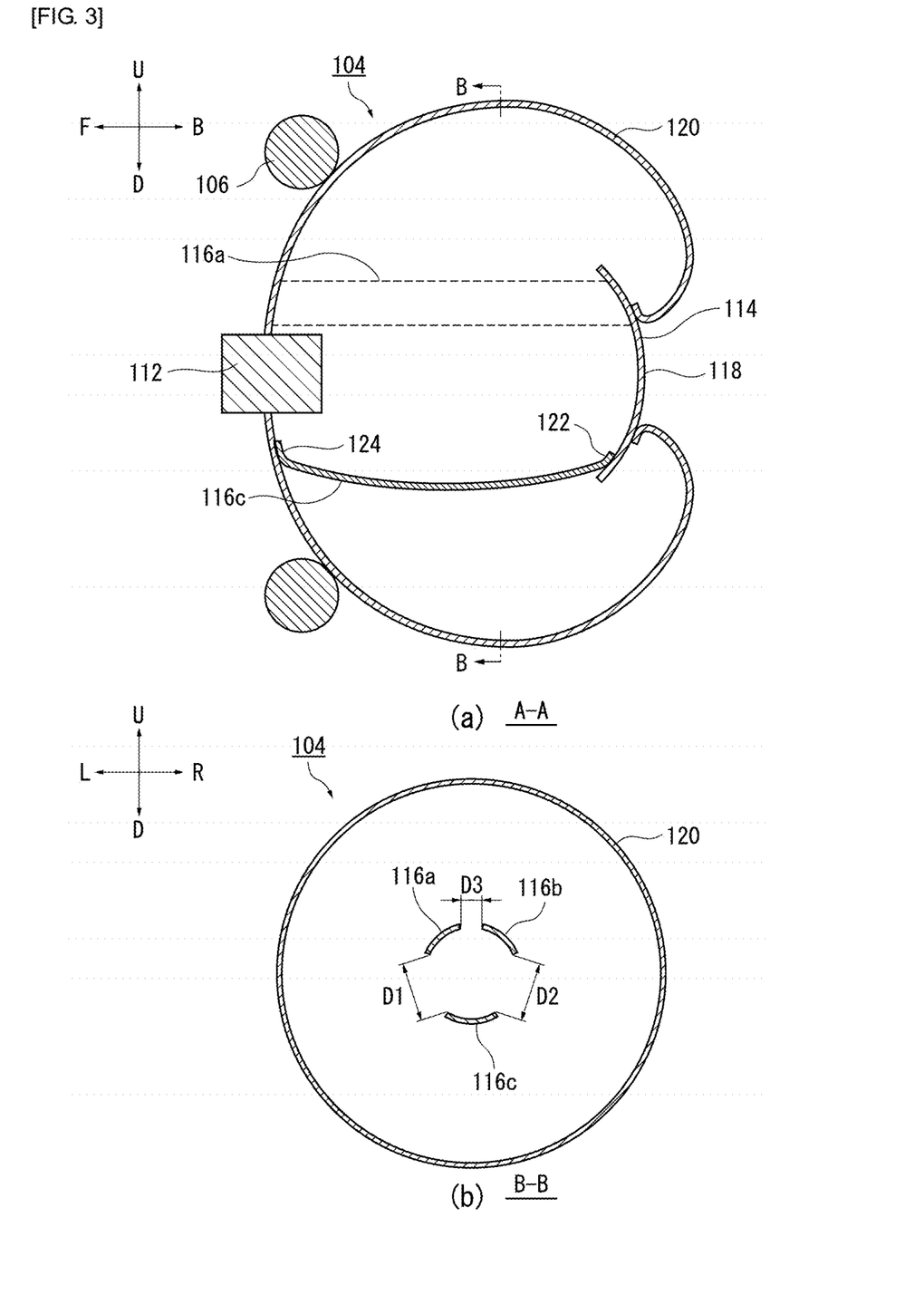
FIG. 3 illustrates cross-section diagrams for the cushion in FIG. 1(b).

FIG. 3 is each of the cross-sectional drawings of the cushion 104 in FIG. 1(b). FIG. 3(a) is the A-A cross-sectional drawing of the cushion 104 in FIG. 1(b). The interior of the cushion 104 is a single space. The outer surface of the cushion 104 is made mainly up of the center base fabric 118 where the internal tethers 116 are connected and that forms the bottom of the concave part 114 and the external base fabrics 120 that make up the outer surface other than the center base fabric 118

Of the internal tethers 116, the lower third tether 116c is used as an example for a description. One end 122 of the third tether 116c is attached to the center base fabric 118, and the other end 124 is connected to a location near the inflator 112 of the cushion 104. As described above, the inflator 112 is fixed to the bottom surface of the storage compartment 108 (see FIG. 1(a)). The inflator 112 is also provided with components called a retainer and a diffuser that clear up the gas. By connecting the other end 124 of the third tether 116c to this retainer and the like, it can be fixed indirectly to the storage compartment 108 via the inflator 112. Furthermore, the other end 124 of the third tether 116c can also be connected in locations that gases from the inflator 112 do not impinge upon, or connected to places that do not move easily in the vicinity of the inflator 112 on external base fabrics 120.

The internal tethers 116 are formed with dimensions that are tensioned while expanding and deploying the cushion 104. For example, the length of the third tether 116c is provided shorter than the distance that the one end 122 and the other end 124 would be attached to on the cushion 104 while expanding and deploying without the internal tethers 116. As the internal tethers 116 are provided with dimensions in the same manner as the third tether 116c, the first end pulls on the center base fabric 118 while the cushion 104 expands and deploys because the second end is fixed. This enables the concave part 114 to be favorably formed for the cushion 104.

FIG. 3(b) is the B-B cross-section in FIG. 3(a). As seen from the seating position, the internal tethers 116 are provided such that the first tether 116a and the second tether 116b line up on the left and right sides on the upper side, and the third tether 116c is provided on the bottom side in between the first tether 116a and the second tether 116b. These first tether 116a, second tether 116b, and third tether 116c are provided in a position to divide the center angle of the external base fabrics 120 and the center base fabric 118 (see FIG. 3(a)) into 3 parts as seen from the seating position.

The third tether 116c is separated from the first tether 116a and the second tether 116b by only distance D1 and distance D2, respectively. In addition, these distances D1 and D2 are larger than the distance D3 between the first tether 116a and the second tether 116b (D1>D3, D2>D3). Arranging in this manner enables the total of 3 internal tethers 116 to pull on the center base fabric (see FIG. 3(a)) over a broad area, and can favorably form the concave part 114.

Furthermore, with each of the internal tethers of FIG. 3(b) as examples, the third tether can also be provided on the upper side relative to the first tether 116a and the second tether 116b. The 3 internal tethers in this configuration will still pull on the center base fabric (see FIG. 3(a)) over a broad area, enabling favorably forming of the concave part 114.

Figure 4:
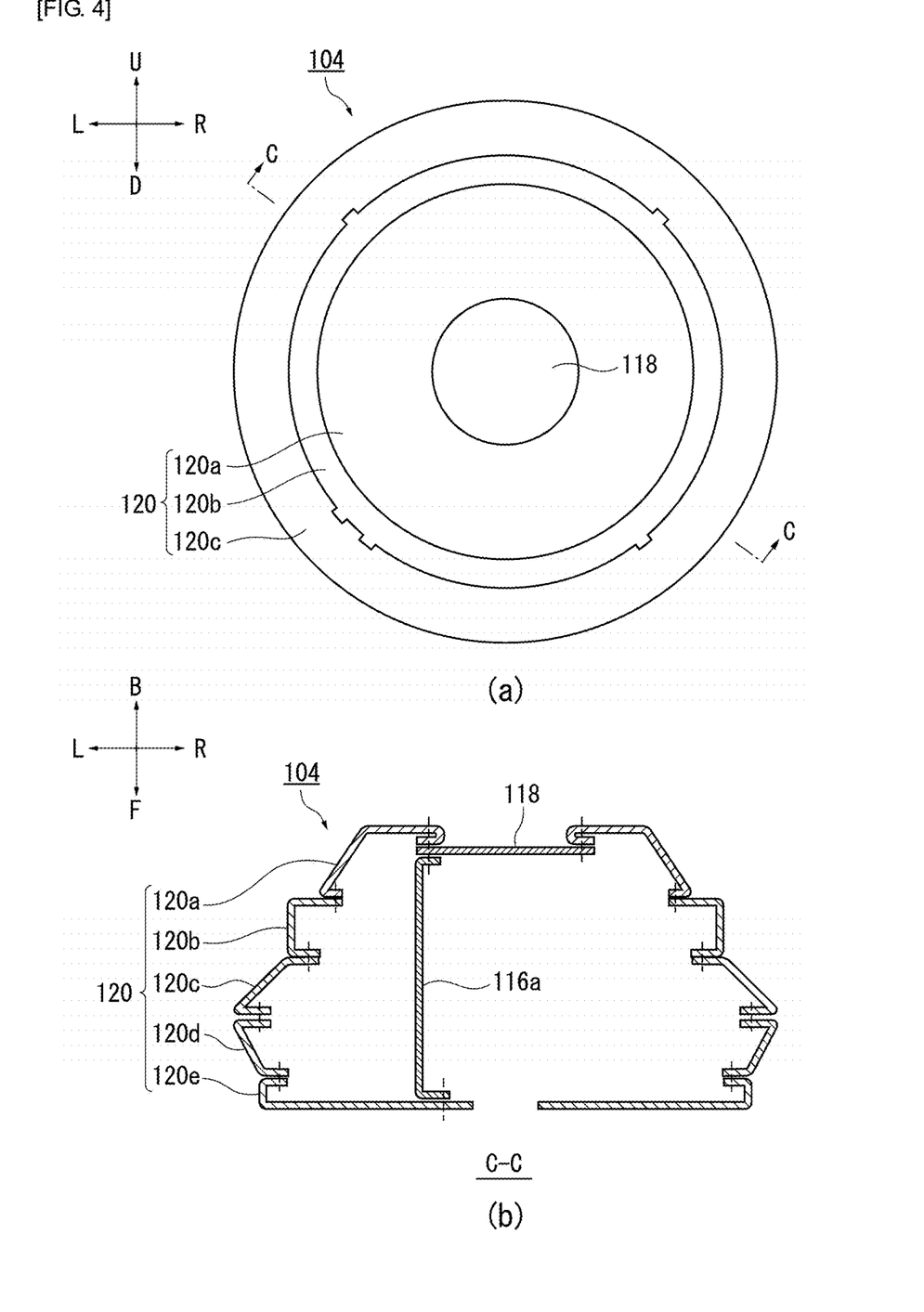
FIG. 4 is a drawing that illustrates the base fabric that makes up the cushion in FIG. 1(a).

FIG. 4 is a figure that illustrates from all directions the base fabric that makes up the cushion 104 in FIG. 1(a). FIG. 4(a), similarly to FIG. 1(b), illustrates the cushion 104 as seen from the seating position. As described above, the external base fabrics 120 are base fabrics that compose a wide span of the external surface of the cushion 104 that has expanded and deployed. The external base fabrics 120 are formed as a combination of a plurality of ring shaped or tubular base fabrics (base fabrics 120a, 120b, and 120c, as well as base fabrics 120d and 120e of FIG. 4(b), and the like).

The center base fabric 118 is in a circular shape as seen from the seating position. In addition, the external base fabrics 120 made up of a plurality of base fabrics are arranged as rotating bodies respectively concentric with the center base fabric 118, in a manner surrounding the outer edge of the circular shaped center base fabric 118. From this configuration, the cushion 104 can be easily expanded and deployed from the steering wheel 106 (see FIG. 1(a)) to the seating position, and in addition, the concave part 114 can be formed more easily during expansion and deployment.

FIG. 4(b) is the B-B cross-section of the cushion 104 in FIG. 4(a). As illustrated in FIG. 4(b), cushion 104 is a structure that combines the external base fabrics 120 that are the plurality of the base fabrics 120a through 120e and the center base fabric 118. This structure provides a smooth expansion and deployment towards the occupant in the seating position. In addition, the concave part 114 can be formed smoothly based on the internal tethers 116 pulling the center base fabric 118. While forming the concave part 114, the interior of the cushion 104 is one space, suppressing the overall amount of base fabrics used. Therefore, weight and materials costs can be reduced. In addition, this lowers the amount of base fabric, enabling folding into more compact spaces.

With the cushion 104 of the present embodiment the concave part 114 described above efficiently enables suppressing the level of injuries of an occupant during an emergency. The following is a description of the process of cushion 104 restraining an occupant 140 with FIG. 5 as reference.

Figure 5:
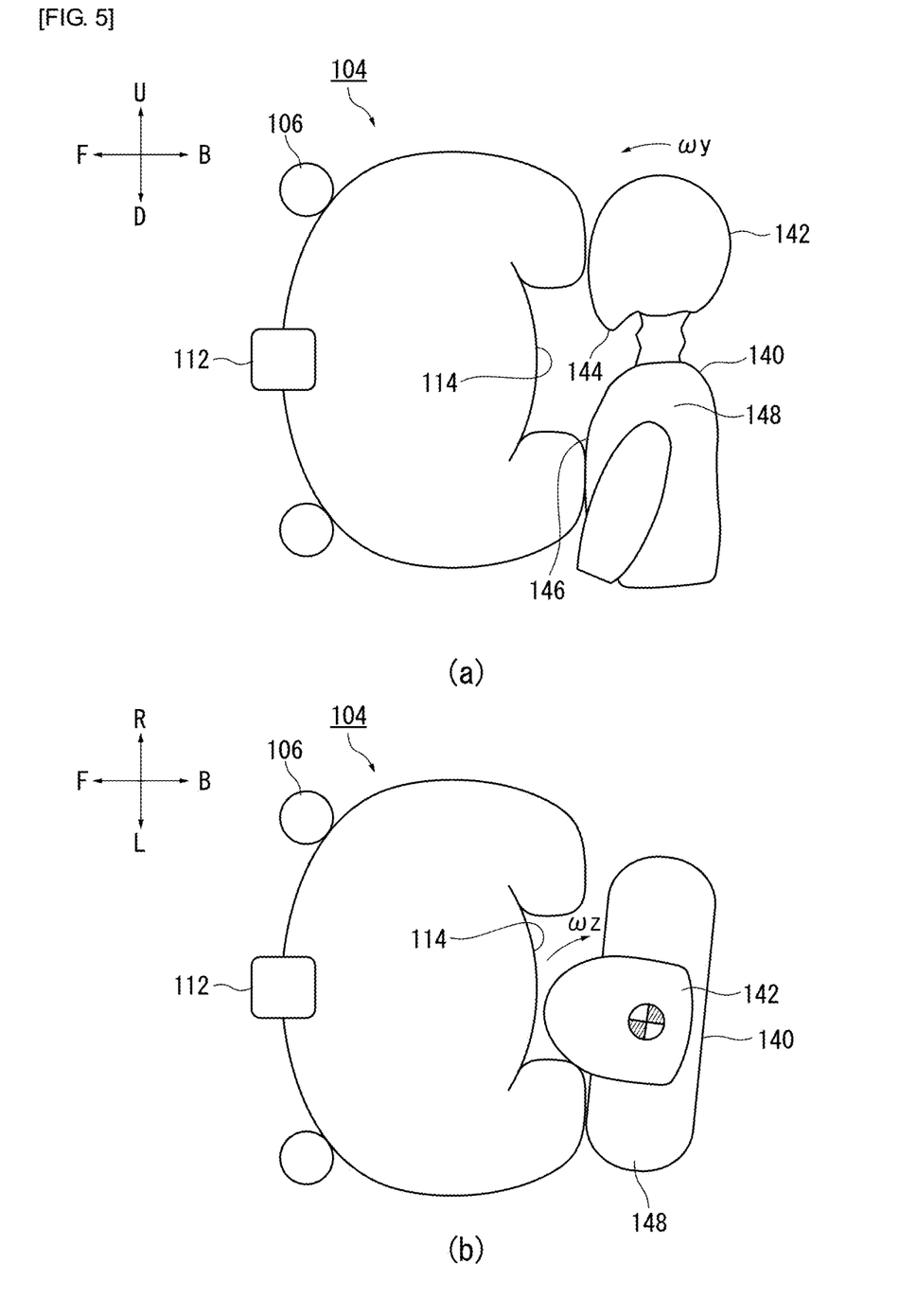
FIG. 5 is a drawing that illustrates the process of the cushion restraining the occupant while expanding and deploying in FIG. 1(b).

FIG. 5 is a figure that illustrates the process of the cushion 104 restraining the occupant 140 during expansion and deployment in FIG. 1(b). FIG. 5(a) is an illustration of the cushion 104 and the occupant 140 as seen from outside the vehicle. When an impact occurs to the vehicle, the cushion 104 is expanded and deployed to the area in front of the occupant 140 in a seating position. Here, the concave part 114 is formed in the center of the cushion 104 on the seating position side.

Based on the concave part 114, the cushion 104 is able to avoid or delay contact with the center of the upper half of the occupant 140 body, or in other words near the chin 144. Generally, the head of a person can be rotated easily when force is applied to the chin 144. For example, there is concern of a vertical rotation ωy of the head 142 occurring in the horizontal axis when an impact is applied on the chin 144 from the front. A cushion 104 that forms a concave part 114 can decrease impact to the chin 144 and reduce the level of injury by restraining rotation of the head 142.

Referring to FIG. 5(b), the process of the cushion 104 restraining the occupant 140 will be described from other directions than that in FIG. 5(a). FIG. 5(b) is an illustration of the cushion 104 and the occupant 140 as seen from above.

For example, in an oblique collision, an impact is exerted diagonally in relation to the vehicle causing the occupant 140 to travel in the forward diagonal direction (FIG. 5(b) center, left diagonal downward). In this case, there were concerns with conventional cushions for driver airbags, where having the cushion 104 contact the head 142 travelling diagonally from the front would cause a horizontal rotation ωz (FIG. 5(b) middle, right rotation), which would turn the head 142, with the cervical vertebrae as the axis. Here, the cushion 104 for the present embodiment forms the concave part 114 on the side toward the occupant, which restrains impact to the area near the chin, restraining the head 142 not only from the front side but from the sides of the head as well. In this manner, the cushion 104 restrains the occupant 140 while suppressing rotation of the head 142.

In this manner, the cushion 104 averts or delays contact to the chin 144 (see FIG. 5(a)) based on the concave part 114, while also restraining body parts of the occupant 140 in the near the concave part 114, such as the head 142, chest 146, shoulders 148, and the like. With this function, the cushion 104 is able to align the movements of the head 142, shoulders 148, and the like of the occupant 140, suppressing and restraining rotation ωy of the head 142 in the horizontal axis and the rotation ωz of the head 142 in relation to the shoulders 148 in the vertical axis of turning to the left and right to a minimum. In this manner, the cushion 104 drastically decreases or negates rotation of the head 142 of the occupant 140, and by reducing the angular velocity of the head 142, the level of injury to the occupant 140 that accompanies rotation of the head 142 can be reduced.

Furthermore, the configuration of the present embodiment enables restraint with a high occupant restraint ability not only during oblique collisions, but during normal vehicle longitudinal direction collisions as well, suppressing the level of injury and movement of the occupant 140. In addition, as described above, rotation ωz in a clockwise rotation was used as an example of rotation that occurs to the head 142 in reference to FIG. 5(b). However, depending on the circumstances of the emergency, for example, there are cases where the occupant 140 moves in a diagonally forward direction to the inner vehicle side, resulting in a counter-clockwise rotation of the head 142 centered on the neck as seen from above. The cushion 104 of the present embodiment can reduce the angular velocity of the head 142 for these counterclockwise rotations as well. In other words, the cushion 104 of the present embodiment is able to attain the same effect regardless of which side of the vehicle the occupant 140 moves towards.

In the description above, this airbag device 100 was implemented as the driver airbag for the driver's seat. However, this airbag device 100 can be installed in places other than the driver's seat. For example, the airbag can be implemented as a frontal airbag by providing on the rear of the front seats to expand and deploy towards into the area in front of the rear seats.

The above described a favorable embodiment of the present invention with reference to the drawings attached. However, the embodiment stated above is a favorable example of the present invention, and other embodiments can be implemented or accomplished using various methods. Unless specifically mentioned with the purpose of limitation in the present specification, the invention is not limited to the shapes, sizes, configured arrangements, and the like of the detailed parts shown in the attached drawings. In addition, the expressions and terms used in the present specification were for the purpose of describing and not limiting, unless it is specifically mentioned in the present specification with the purpose of limitation.

Therefore, it is evident that a person skilled in the art would conceive and obtain modified examples and revised examples within the scope of the patent claims, and these would naturally be understood to come under the technical scope of the present invention.

INDUSTRIAL APPLICABILITY

The present invention can be used as an airbag device for restraining occupants during an emergency.

EXPLANATION OF CODES

100. Airbag device, 102. Seat, 104. Cushion, 106. Steering wheel, 108. Storing part, 110. Cover, 112. Inflator, 114. Concave part, 116. Internal tether, 116a. First tether, 116b Second tether, 116c. Third tether, 118 Center base fabric, 120 External base fabric, 120a to 120e. Base fabrics, 122. First end, 124. Second end, 140. Occupant, 142. Head, 144. Chin, 146. Chest, 148. Shoulder

The invention claimed is:

1. An air bag device comprising:
   an inflator that is installed on a vehicle and is able to supply gas,
   an airbag cushion that expands and deploys in front of a seating position of the vehicle passenger, and
   at least one internal tether with a first end connected to a seating position side inside the airbag cushion and a second end connected to a vehicle front side inside the airbag cushion,
   the cushion forming a concave part at the center of the seating position side recessed due to pulling by the internal tether,
   wherein the at least one internal tether includes, as viewed from the seating position, a first tether and a second tether arranged to the upper left and right and a third tether provided between the first tether and the second tether above or below as viewed from the first tether and second tether, and
   wherein the third tether is arranged at a distance farther away from the first tether and second tether than the distance between the first tether and second tether.

2. The airbag device according to claim 1, wherein:
   the inflator and airbag cushion are installed in a location in front of the seating position in the passenger cabin,
   part of the inflator is inserted inside the airbag cushion, and
   the second end of the internal tether is connected among the inflator or airbag cushion, near to said inflator.

3. The airbag device according to claim 2, wherein the internal tether is formed with a dimension such that the airbag cushion is under tension when the airbag cushion expands and deploys.

4. The airbag cushion according to claim 2, wherein the airbag cushion includes:
   a center base fabric formed at the bottom of the concave part where the internal tether is connected, and
   an external base fabric that forms the outer surface other than the center base fabric, and wherein:
   the center base fabric is circular, and
   the external base fabric is formed surrounding the circular center base fabric.

5. The airbag device according to claim 2, wherein the internal tether includes, as viewed from the seating position, a first tether and second tether arranged to the upper left and right and a third tether provided between the first tether and the second tether above or below as viewed from the first tether and second tether.

6. The airbag device according to claim 2, wherein the inflator and airbag cushion are stored in the steering wheel of the vehicle.

7. The airbag device according to claim 1, wherein the internal tether is formed with a dimension such that the airbag cushion is under tension when the airbag cushion expands and deploys.

8. The airbag cushion according to claim 7, wherein the airbag cushion includes:
   a center base fabric formed at the bottom of the concave part where the internal tether is connected, and
   an external base fabric that forms the outer surface other than the center base fabric, and wherein:
   the center base fabric is circular, and
   the external base fabric is formed surrounding the circular center base fabric.

9. The airbag device according to claim 7, wherein the internal tether includes, as viewed from the seating position, a first tether and second tether arranged to the upper left and right and a third tether provided between the first tether and the second tether above or below as viewed from the first tether and second tether.

10. The airbag device according to claim 7, wherein the inflator and airbag cushion are stored in the steering wheel of the vehicle.

11. The airbag cushion according to claim 1, wherein the airbag cushion includes:
a center base fabric formed at the bottom of the concave part where the internal tether is connected, and
an external base fabric that forms the outer surface other than the center base fabric, and wherein:
the center base fabric is circular, and
the external base fabric is formed surrounding the circular center base fabric.

12. The airbag device according to claim 11, wherein the external base fabric includes a plurality of ring shaped or tube shaped base fabrics arranged concentric with the center base fabric.

13. The airbag device according to claim 12, wherein the internal tether includes, as viewed from the seating position, a first tether and second tether arranged to the upper left and right and a third tether provided between the first tether and the second tether above or below as viewed from the first tether and second tether.

14. The airbag device according to claim 11, wherein the internal tether includes, as viewed from the seating position, a first tether and second tether arranged to the upper left and right and a third tether provided between the first tether and the second tether above or below as viewed from the first tether and second tether.

15. The airbag device according to claim 11, wherein the inflator and airbag cushion are stored in the steering wheel of the vehicle.

16. The airbag device according to claim 1, wherein the first tether and second tether are arranged on an upward side as viewed from the seating position, and
the third tether is provided on the lower side as viewed from the first tether and second tether.

17. The airbag device according to claim 16, wherein the third tether is arranged at a distance farther away from the first tether and second tether than the distance between the first tether and second tether.

18. The airbag device according to claim 1, wherein the inflator and airbag cushion are stored in the steering wheel of the vehicle.

19. An air bag device comprising:
an inflator that is installed on a vehicle and is able to supply gas,
an airbag cushion that expands and deploys in front of a seating position of the vehicle passenger, and
at least one internal tether with a first end connected to a seating position side inside the airbag cushion and a second end connected to a vehicle front side inside the airbag cushion,
the cushion forming a concave part at the center of the seating position side recessed due to pulling by the internal tether,
wherein the at least one internal tether includes, as viewed from the seating position, a first tether and a second tether arranged on an upward side as viewed from the seating position, and a third tether is provided on the lower side as viewed from the first tether and second tether,
wherein the first tether and second tether are arranged on an upward side as viewed from the seating position,
the third tether is provided on the lower side as viewed from the first tether and second tether, and
wherein the third tether is arranged at a distance farther away from the first tether and second tether than the distance between the first tether and second tether.

20. An air bag device comprising:
an inflator that is installed on a vehicle and is able to supply gas,
an airbag cushion that expands and deploys in front of a seating position of the vehicle passenger, and
at least one internal tether with a first end connected to a seating position side inside the airbag cushion and a second end connected to a vehicle front side inside the airbag cushion,
the cushion forming a concave part at the center of the seating position side recessed due to pulling by the internal tether,
wherein the airbag cushion includes:
a center base fabric formed at the bottom of the concave part where the internal tether is connected, and
an external base fabric that forms the outer surface other than the center base fabric, and wherein:
the center base fabric is circular,
the external base fabric is formed surrounding the circular center base fabric, and
wherein the external base fabric includes a plurality of ring shaped or tube shaped base fabrics arranged concentric with the center base fabric configured to forming of the concave part.

* * * * *